May 5, 1970  D. A. SUTTON ET AL  3,509,807
PHOTOGRAPHIC APPARATUS
Filed May 15, 1967  3 Sheets-Sheet 1

INVENTORS
Dennis A. Sutton
John H. Jeffree
BY
DeLio and Montgomery
ATTORNEYS

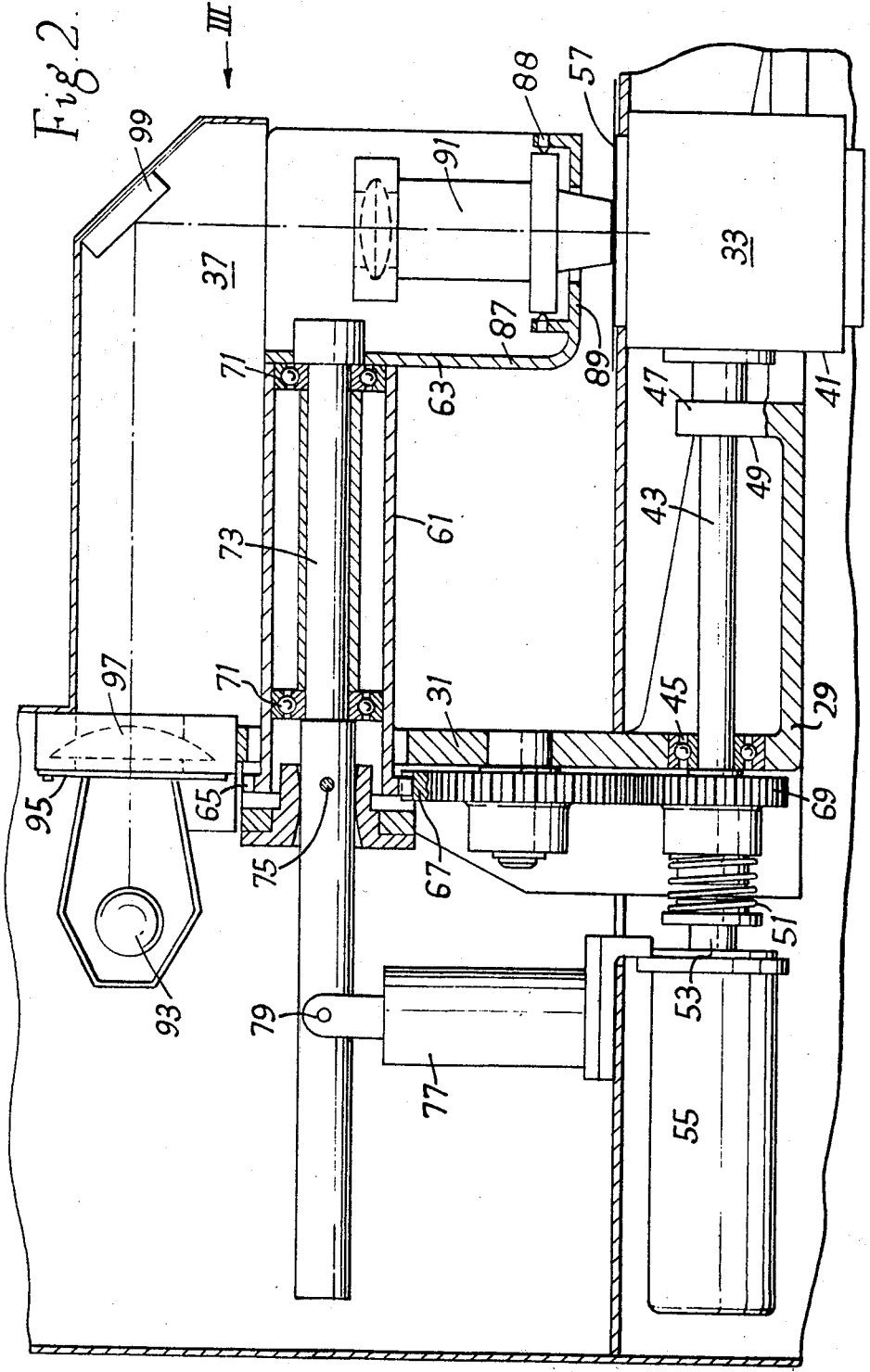

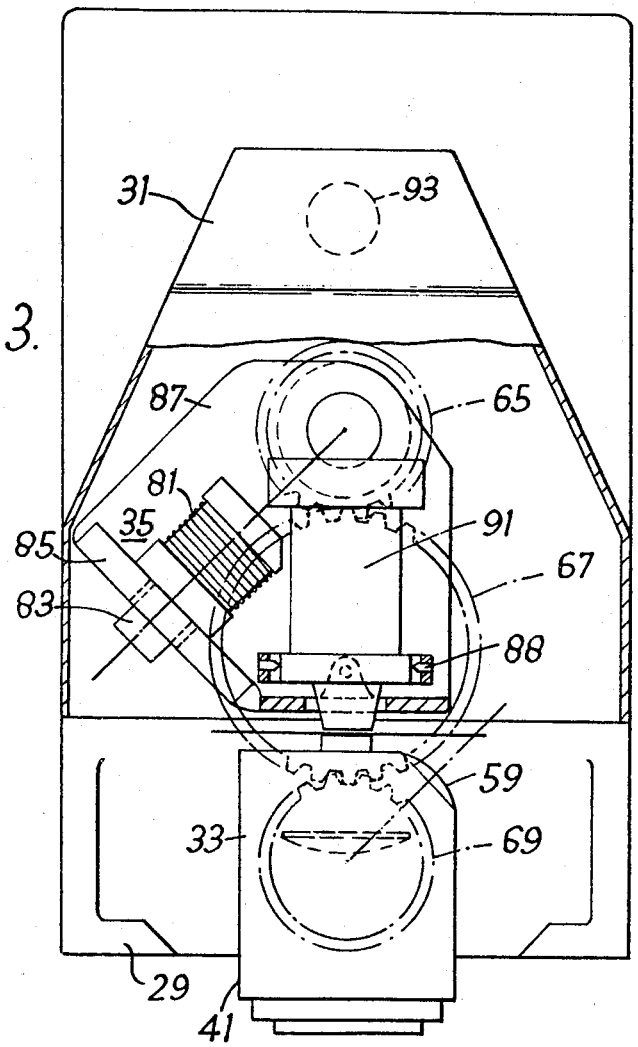
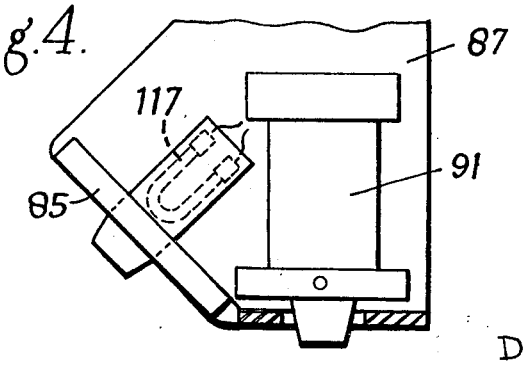

United States Patent Office 3,509,807
Patented May 5, 1970

---

3,509,807
PHOTOGRAPHIC APPARATUS
Dennis A. Sutton, Hatfield, and John H. Jeffree, London, England, assignors, by mesne assignments, to National Research Development Corporation, London, England, a corporation of Great Britain
Filed May 15, 1967, Ser. No. 638,239
Claims priority, application Great Britain, May 17, 1966, 21,964/66
Int. Cl. G03b *17/50*
U.S. Cl. 95—13                                                                 10 Claims

ABSTRACT OF THE DISCLOSURE

Photographic apparatus wherein a reduced image of a document is formed on one frame of a Kalvar, fiche-type film by an optical system including a source of ultra-violet light. The film then remains stationary in the apparatus whilst the exposed frame is developed, by movement of a heater block into engagement with the frame, and fixed, by further exposure to ultra-violet light. Throughout these operations the film is visible to an operator. The film can then be removed and stored or further images can be formed on adjacent frames.

BACKGROUND OF THE INVENTION

This invention relates to photographic apparatus. In the past, when large printed matter was transferred onto film and vice versa with photographing apparatus, the film had to travel through several stations, that is, from the projecting station to a developing station and then to a fixing station. This necessitated the use of undesirably large photographing apparatus and transfer mechanisms for conveying the film from one station to another. With such apparatus, it was not possible to expose just one frame of the film, develop and fix that frame, without affecting the remainder of the film. In such prior art apparatus, it was necessary to pass the entire film through the developing station, thus limiting the application of the apparatus. Further, with many of the prior art devices, it was not possible to view the image formed on the film immediately after it was formed without transmitting the film to a viewing station.

STATEMENTS OF THE INVENTION

The present invention includes photographic apparatus comprising a support for a photographic film which can be developed by heating, an optical system including a source which emits radiation at wavelengths suitable for activating the said film and optical projection means adapted to form an image of a document or the like on to a film mounted on the support, means for applying heat to develop the film on the support after exposure thereof to the radiation from the source, and means for fixing a developed film on the support.

Suitably, the fixing means includes a source of ultra-violet light and means for projecting light from the source of ultra-violet light on to a developed film on the support.

The invention also includes photographic apparatus comprising a support for a photographic film which can be developed by the application thereto of electromagnetic radiation of predetermined wavelengths, an optical system including a source which emits radiation at wavelengths suitable for activating the said film and optical projection means adapted to form an image of a document or the like on to a film mounted on the support, and means for applying the said electromagnetic radiation to develop and fix the film on the support after exposure thereof to radiation from the source.

Preferably, the optical projection means are adapted to form a reduced image on a small area of the film.

Means may be provided for effecting relative movement in a direction parallel with the plane of the film between the optical system and the film, whereby a further reduced image can be formed on a second small area of the film.

The invention will now be described, by way of example, with reference to the accompany drawings, in which:

FIG. 2 is an enlarged view of an upper part of the apparatus of FIG. 1, partly in section;

FIG. 3 is a front elevation of the part of the apparatus shown in FIG. 2, viewed in the direction of the arrow III of FIG. 2; and FIG. 4 is a view corresponding to that shown in FIG. 3 of a part of a second apparatus according to the invention.

Figure 1:
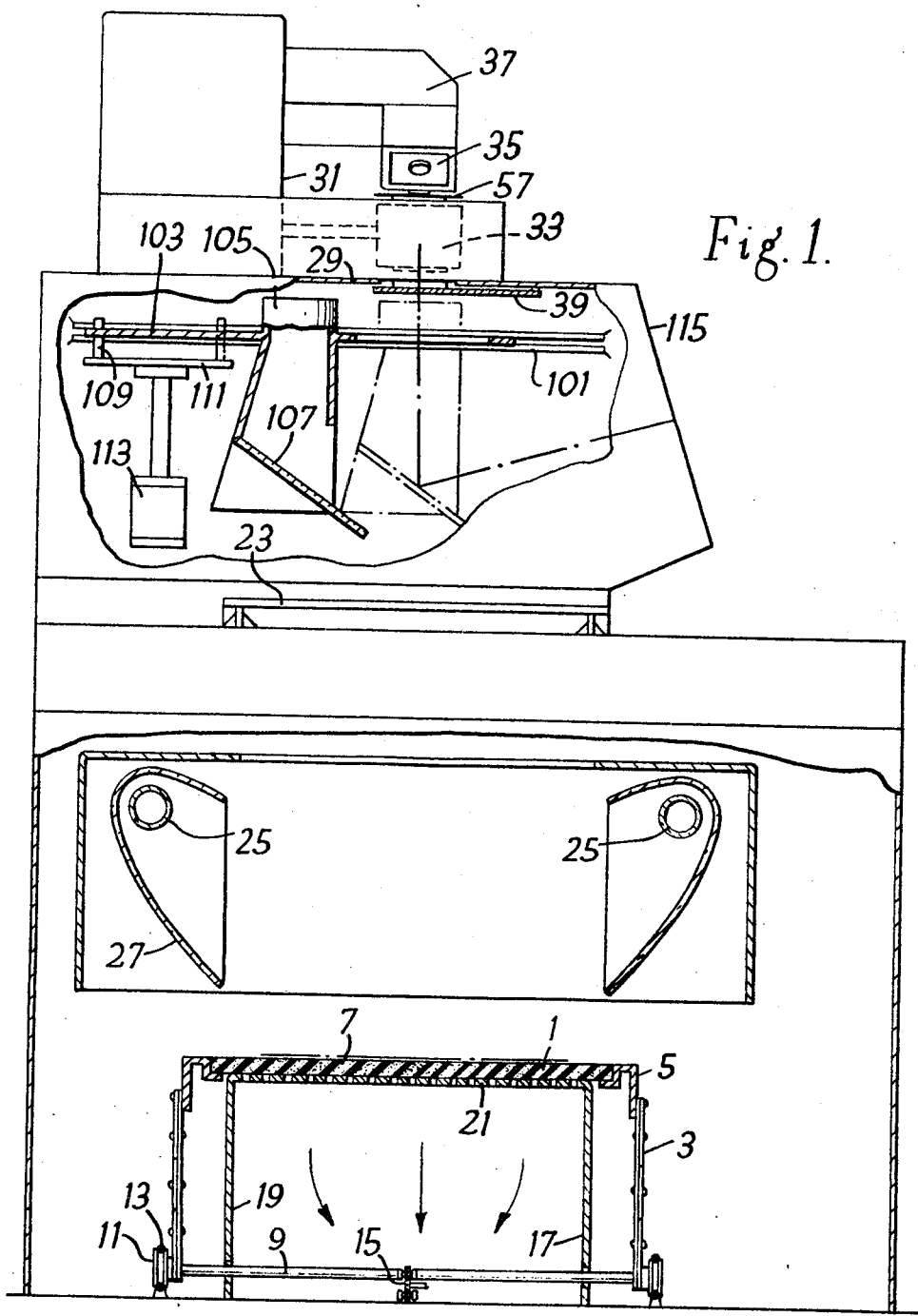
FIG. 1 is a side elevation, partly in section, of a photographic apparatus according to the invention.

The apparatus shown in the drawings is for use in taking photographs of documents on film material such as Kalvar which is sensitive to ultra-violet radiation but relatively insensitive to visible light. An exposed film is developed by heating and is fixed by again subjecting the film to ultra-violet radiation.

The apparatus includes an optical system having a light source 25 which emits a relatively high proportion of ultra-violet radiation and optical projection means adapted to produce a reduced image of a document on a small area of a Kalvar film. Suitably, an image of approximately 0.65 x 0.46 inch is produced from a document which is 13.5 inches x 9.5 inches. The exposed area of the film is then developed and fixed whilst still located in the apparatus.

Those parts of the film which have not been subjected to ultra-violet radiation and heating remain substantially unaffected. Means are therefore provided for moving an adjacent, unexposed area of the film on to the optical axis of the optical projection system so that a photograph of a further document can be made on this adjacent area. Alternatively, the film can be removed from the apparatus after a photograph has been formed on one area and the film can be stored and used for making further photographs at a later date.

Means are provided for viewing the image formed on the film whilst fixing is being carried out, thereby enabling the quality of the image to be assessed as soon as possible after its formation.

In FIG. 1 of the drawings the apparatus is shown in side elevation with the front theerof to the right of the drawing. Referring now to this figure, a tray 1 for supporting a document which is to be photographed is supported at the front and rear edges thereof by respective lazy-tong mechanisms 3, shown diagrammatically in the drawings. Lazy-tong mechanisms are well known, as defined in Audels Mechanical Dictionary, pub. by Theo Audel & Co. (1942). Such a mechanism is formed from a combination of paired links. Each link of a pair is pivotally connected at its midpoint to the midpoint of the other link of the pair, thereby forming a pair of "scissors." The ends of each pair of scissor links are pivotally connected to the ends of another pair of similarly connected link members to form a series of scissor-like link members pivotally connected to each other. The tray 1 includes a metal frame 5 having downwardly extending front and rear flanges to which the lazy-tong mechanisms 3 are secured and a sheet 7 of plastic foam material which is supported by the frame. The plastic foam of sheet 7 is flexible and porous and a clip (not shown) is piovtally mounted at one side of the frame 5 and maintains a document in engagement therewith.

At their lower ends the lazy-tong mechanisms 3 are mounted on two mutually spaced, parallel arranged spindles 9, which extend in a direction from front to rear of the apparatus. Rollers 11 at opposed ends of each spindle 9 are engaged in respective runners 13 in a lower part of the apparatus.

The spindle 9 which is on the right, as viewed by an operator standing at the front of the apparatus, is secured to an upper run of an endless chain 15 which is coupled via a clutch mechanism (not shown) to an output shaft of a motor (also not shown).

Located in a lower part of the apparatus, and extending upwardly between the lazy-tong mechanisms 3, is a housing 17 having upright side walls 19 and a top wall 21. The top wall 21 is apertured and suction is applied to these apertures by means of a fan within the housing (not shown).

With the lazy-tong mechanisms 3 extended upwardly and disposed to the left of the position shown in FIG. 1, as viewed by an operator at the front of the apparatus, the tray 1 is located immediately below a hinged lid 23 on the left-hand side of the apparatus.

Energization of the motor then serves to drive the chain 15 so that the upper run thereof moves from left to right, as viewed by the operator, and urges the right-hand spindle 9 in the same direction. Initially the left-hand spindle 9 is restrained by a clip (not shown) so that movement of the right-hand spindle 9 causes the lazy-tong mechanisms 3 to collapse and thereby lower the tray 1 until the sheet 7 engages the top wall 21 of housing 17. Suction, applied to the sheet 7 by the fan through the apertured wall 21, causes the sheet to conform to the flat shape of the top wall and also serves to maintain the document in engagement with the sheet 7 and in a correspondingly flat configuration. Further movement of the right-hand spindle 9 then causes the lazy-tong mechanisms 3, the tray 1 and the document thereon to be moved to the right and into the position shown in FIG. 1, where the document is on the optical axis of an imaging lens system, hereinafter described. During this movement the clip is engaged by a guide (not shown) and is lifted thereby out of engagement with the document prior to movement of the document on to the optical axis. The document is then maintained in flatwise engagement with the sheet solely by suction, as mentioned above.

Light for illuminating a document on the tray 1 is provided by two mercury discharge lamps 25 of the MBI400 type. These lamps are disposed above the housing 17 at locations respectively forwardly and rearwardly of the position assumed by the document when in its operative position.

Each lamp 25 is mounted on a reflector casing 27 which is adapted to direct light from the lamp 25 downwardly on to the document, the two lamps 25 together providing an intensity of illumination which is substantially uniform over the area of a document of the above-mentioned dimensions. The reflector casing 27 of each lamp includes a parabolic reflector which is arranged with its axis horizontal and extending from side to side of the apparatus and two upright side reflectors. Each lamp 25 extends along the axis of the parabolic reflector of the associated casing 27 and its position relative thereto can be adjusted in three dimensions.

Referring now to FIGS. 1, 2 and 3, a base plate 29 having an upstanding rear wall 31 integral therewith is mounted in an upper part of the apparatus. The rear wall 31 serves as a support for an imaging lens system 33, developing means 35, and fixing means 37. A main shutter 39 is provided below the base plate 29, between a document on tray 1 and the imaging lens system 33.

Referring to FIGS. 2 and 3, the imaging lens system 33 is mounted in a housing 41 secured to a spindle 43 above the base plate 29. The spindle 43 is supported at intermediate locations thereon in bearings 45 and 47 in the rear wall 31 and an upstanding bracket 49, respectively. At its rear end the spindle 43 is coupled by an overrunning clutch mechanism 51 to an output shaft 53 of a motor 55.

With the lens housing 41 in the position shown in FIGS. 2 and 3 the imaging lens system 33 is adapted to focus light travelling upwardly from a document on the tray 1 on to one frame of a film 57 supported above the housing 41, by film supporting means not shown in the drawings. Upon rotation of the spindle 43 through 55° a resilient pad 59 of polytetrafluorethylene, which is mounted on a side wall of the housing 41 and is of area substantially equal to the area of a frame of the film 57, is presented to the film, for purposes hereinafter described.

Above the spindle 43 and extending parallel therewith is a tube 61 having a supporting bracket 63 depending from a forward end thereof. The tube 61 is coupled to the spindle 43 by means of a gear 65 at the rearward end of the tube, an idler gear 67 on the rear wall 31, and a gear 69 on the spindle 43. The tube 61 is journalled in bearings 71 whose inner races are secured to a spindle 73 which extends coaxially of the tube. Spindle 73 is pivotally supported at an intermediate location thereon by a pin 75 on rear wall 31, pivotal movement of the spindle 73 about the pin 75 being effected by energising a solenoid 77 to cause movement of a link 79 coupled to a rearward end of the spindle.

Rotation of the spindle 43 through 55° causes a corresponding rotation of the tube 61 and the bracket 63 depending therefrom. Pivotal movement of the upper spindle 73 about the pin 75 causes substantially vertical movement of the bracket 63.

The developing means 35 include a heater element 81 and a heater block 83 which are mounted on an asbestos plate 85 extending forwardly from an upright limb 87 of bracket 63. The heater block 83 extends downwardly through an aperture in plate 85 and has an end face substantially equal in area to a frame of the film 57. When the lower spindle 43 is rotated through 55° from the position shown in FIGS. 2 and 3, bringing the lens housing 41 into a position wherein the resilient pad 59 faces the lower surface of the film 57, the tube 61 rotates so that the heater block 83 faces the upper surface of the film. Pivotal movement of the upper spindle 73 about the pin 75 then causes the bracket 63 and plate 85 to move downwardly so that a frame of the film 57 is clamped between the block 83 and the resilient pad 59.

Control means (not shown) are associated with the heater element 81 and serve to maintain the temperature of the operative face of the block 83 at 120° C. to an accuracy of ±1° C. A safety cut-out (also not shown) is also provided.

Mounted on gimbals 87 on a forwardly extending limb 89 of bracket 63 are lens means 91 of the fixing means 37. The lens means 91 are arranged with the optical axis thereof in an upright plane and angularly displaced about the axis of spindle 73 by 55° relative to heater block 83. The fixing means 37 also includes a mercury vapour lamp 93 which is mounted on rear wall 31, a shutter 95, a lens 97 for projecting light from the lamp 93 forwardly, and a mirror 99 which projects the light downwardly to lens means 91. When the tube 61 has been rotated through 55° from the position of FIGS. 2 and 3 and the lamp 93 is energized, ultra-violet light from the lamp 93 is projected downwardly by the lens means 91 on to a film frame 57 which has been exposed to light from lamps 25 and subjected to heating by the block 83.

Referring to FIG. 1, at a location intermediate a document on the tray 1 at the foot of the apparatus and the base plate 29 are horizontal guides 101 which extend in a direction from front to rear of the apparatus, and engaged in these guides is a supporting plate 103 for a lens assembly 105 and a mirror 107. The plate 103 is formed with an elongated aperture (not shown) which is engaged by a pin 109 on a disc 111 secured to an output shaft of a motor 113. Energization of the motor 113 to rotate disc 111 causes movement of the supporting plate 103 forwardly or rearwardly of the apparatus.

With the plate 103 in its rearward position, as shown in full lines in FIG. 1, light reflected from a document on tray 1 can travel upwardly to the imaging lens system 33 above the base plate 29. When the plate 103 is advanced forwardly to the position shown in dotted lines in FIG. 1 the lens assembly 105 is disposed vertically below the imaging lens system 33. Light from the lamp 93 of fixing means 37 is then projected downwardly via lens means 91 on to a developed frame of a film 57 and an image of this frame is projected on to a viewing screen 115 by imaging lens system 33, lens assembly 105 and mirror 107.

In operation of the apparatus a Kalvar film 57 is placed in the holder above the base plate 29 and the position of the holder adjusted by the control means so that a predetermined frame of the film 57 is located on the optical axis of the imaging lens system 33. The timing mechanism is adjusted to ensure predetermined exposure, developing and fixing times. A document is placed face uppermost on the tray 1.

A main switch of the apparatus is then operated, causing the solenoid 77 to be energized to pivot spindle 73 about pin 75 and move bracket 63 downwardly to clamp a frame of the film 57 between lens means 91 and imaging lens housing 41. At the same time the motor coupled to chain 15 is energized, causing the tray 1 to be moved downwardly and then sideways into a position wherein light from the two mercury lamps 25 is directed downwardly on to the document on the tray 1, as described above.

Arrival of the document in this position operates a microswitch, which causes operation of the timer mechanism to commence. Thus, a relay associated with the shutter 39 is first operated, causing the shutter to open and allow light from the lamps 25 which is reflected upwardly by the document to reach the imaging lens system 33. An image of the document is therefore projected on to the film 57 by the lens system 33. After a predetermined exposure time, determined by the setting of the timing mechanism, the relay associated with the shutter 39 is again operated and the shutter 39 closes to prevent further light from the lamps 25 reaching the film 57. The solenoid 77 is also de-energized to lift the lens means 91 from the film 57.

To develop the exposed frame of film 57 the timing mechanism next operates a switch associated with the clutch mechanism 51, thereby coupling the lower spindle 43 to the output shaft 53 of motor 55. The lower spindle 43 and the housing 41 of the imaging lens system 33 are thereby rotated through 55°, and the tube 61 and bracket 63 are likewise rotated by a similar amount by engagement of the gears 65, 67 and 69.

Rotation of the spindle 43 and tube 61 through 55° brings the resilient pad 59 on the housing 41 into facing relationship with the lower surface of the exposed frame of the film 57 and the heater block 83 into facing relationship with the upper surface of the frame. Upon reaching this 55° position the lens housing 41 engages a stop (not shown) and the motor 55 then overruns and is switched off by the timing mechanism. The timing mechanism now re-energizes the solenoid 77 so that the upper spindle 73 is again rotated about the pin 75 and the heater block 83 is moved down to engage the film 57, clamping the exposed frame between the block 83 and the resilient pad 59. Heat from the heater element 81 is now supplied to the film 57 via the block 83 and the exposed frame of the film 57 is developed.

After a predetermined interval of time, again determined by the timing mechanism, solenoid 77 is de-energized and the upper spindle 73 is rotated upwardly about the pin 75 so that the heater block 83 is dis-engaged from the film 57. A further microswitch is then operated to switch on motor 55, which operates in the reverse direction to rotate the tube 61 and spindle 43 through 55° back to their original positions.

To fix the developed frame of the film 57 a further microswitch is now operated by the timing mechanism and causes the shutter 95 of the fixing means 37 to open. At the same time the motor 113 is energized to move the supporting plate 103 forwardly, bringing the lens assembly 105 vertically below imaging lens system 33. Light from the lamp 93 is now projected down on to the developed frame of the film 57 to effect fixing thereof. At the same time the light travels downwardly through the frame and the imaging lens system 33 to the lens assembly 105 and mirror 107, which project an image of the frame on to the viewing screen 115. The frame can therefore be viewed throughout fixing and the quality of the image formed thereon quickly assessed. After a predetermined time the timing mechanism operates the shutter 95 to prevent further light from lamp 93 from reaching the film and the motor 113 is energized to move the lens assembly 105 and mirror 107 rearwardly.

It will be appreciated that in carrying out the above operations of exposing a frame of the film 57 heating the frame for developing purposes, and then subjecting the frame to further ultraviolet light for fixing, the remainder of the film is substantially unaffected. The fiilm 57 can therefore be moved across the table so that an adjacent frame is located on the optical axis of imaging lens system 33 and a photograph of a further document can be formed on this adjacent frame. Alternatively, the film can be removed from the apparatus, stored, and further frames thereon used for taking photographs of documents on a later date.

In addition to the Kalvar films which can be developed by heating and fixed by ultra-violet light, films are also available which can be developed by subjecting an exposed frame thereof to a flash of ultra-violet light. To this end the above-described apparatus can be modified in accordance with the apparatus shown in FIG. 4. On this figure a small xenon flash tube 117 is mounted on bracket 63 in place of the heating means 35. After exposure of a frame of the film 57 by light from the lamps 25 and rotation of the housing 41 and bracket 63 through 55°, as described above, the flash tube 117 is energized to apply a short, high intensity pulse of ultra-violet radiation to the frame. The high intensity radiation effects developing and fixing of the image on the frame.

We claim:

1. Photographic apparatus comprising a first support for a photographic film which can be developed by heating, an optical system including a source which emits radiation at wavelengths suitable for activating said film, optical projection means adapted to form an image of a document or the like on said film on said first support, heating means including a heated block for applying heat to develop said film on said first support after exposure thereof to the radiation from the source, and means for effecting relative movement between said film and the heater block so as to effect engagement of the block and the film and developing of the film, the optical system and the heating means being adapted to operate on a film which remains stationary relative to the first support throughout the projetcion and developing operations and in the interval of time between the operations.

2. Photographic apparatus as claimed in claim 1, wherein means are provided for fixing a developed film on the support and the film remains stationary relative to the first support throughout the projection, developing and fixing operations and in the interval of time between each operation.

3. Photographic apparatus as claimed in claim 2, wherein said first support is stationary throughout the projection, developing and fixing operations.

4. Photographic apparatus as claimed in claim 3, wherein the heater block is disposed on the side of the film remote from the first optical projection means, and the moving means are arranged to effect movement of the heater block so that the film is engaged between the block and a housing of first lens means in the first optical projection means.

5. Photographic apparatus as claimed in claim 3, wherein second support means for the heating means and a housing of the first lens means in the first optical projection means are rotatable between a first position, wherein radiation from the source travels via the first lens means to the film, and a second position, wherein film is clamped between the heater block and a backing plate on the said housing.

6. Photographic apparatus as claimed in claim 5, comprising means coupling together the said second support means and the said housing so that rotation of the second support means is accompanied by a corresponding rotation of the housing.

7. Photographic apparatus as claimed in claim 6, wherein the second support means and the housing are secured to respective mutually-spaced, parallel-arranged rotatable elements, which elements are coupled together by gear means.

8. Photographic apparatus as claimed in claim 2, wherein the fixing means include a second source of ultra-violet light and second projection means for projecting light from the second source of ultra-violet light onto a developed film on the support.

9. Photographic apparatus as claimed in claim 8, wherein the heating means and second lens means of the second projection means are mounted on a second support means rotatable between a first position, wherein light from the second source can be projected via the second projection means onto the film, and a second position, wherein a heater block of the heating means faces the film.

10. Photographic apparatus as claimed in claim 8, comprising third lens and projection means and a viewing screen so arranged that light from the second source of ultra-violet light projected onto the film by the second projection means travels via the film and is then projected onto the screen by said third lens and projection means, thereby providing an image of the developed film.

References Cited

UNITED STATES PATENTS

| | | | |
|---|---|---|---|
| 3,148,612 | 9/1964 | Jacobs et al. | 95—89 |
| 3,183,768 | 5/1965 | Rosenburgh et al. | 95—13 |
| 3,194,112 | 7/1965 | Back. | |
| 3,301,157 | 1/1967 | Smith et al. | 95—89 |
| 3,382,764 | 5/1968 | Chen | 95—13 |
| 3,023,686 | 3/1962 | Meyer | 95—94 |
| 3,372,617 | 3/1968 | Pfaff | 355—27 XR |

NORTON ANSHER, Primary Examiner

R. L. MOSES, Assistant Examiner

U.S. Cl. X.R.

95—89; 355—27, 64